United States Patent [19]
Gautier et al.

[11] Patent Number: 5,088,386
[45] Date of Patent: Feb. 18, 1992

[54] PNEUMATIC BRAKE BOOSTER

[75] Inventors: Jean-Pierre Gautier; Ulysse Verbo, both of Aulnay-sous-Bois; Miguel Perez, Argenteuil, all of France

[73] Assignee: Bendix Europe Services Techniques, Drancy, France

[21] Appl. No.: 611,580

[22] Filed: Nov. 9, 1990

[30] Foreign Application Priority Data

Nov. 30, 1989 [FR] France .................. 89 15774

[51] Int. Cl.⁵ ............................. F01B 29/00
[52] U.S. Cl. ........................ 92/161; 92/169.2
[58] Field of Search ............ 92/146, 161, 169.2; 91/369.2

[56] References Cited

U.S. PATENT DOCUMENTS

| | | | |
|---|---|---|---|
| 4,325,218 | 4/1982 | Weiler et al. | 92/128 |
| 4,330,996 | 5/1982 | Becht et al. | 92/48 |
| 4,393,750 | 7/1983 | Wagner | 91/369.2 |
| 4,407,184 | 10/1983 | Ando et al. | 92/169.2 |
| 4,484,509 | 11/1984 | Belart et al. | 91/369.2 |
| 4,492,081 | 1/1985 | Weiler et al. | 92/169.2 |
| 4,784,046 | 11/1988 | Gautier | 92/128 |
| 4,790,235 | 12/1988 | Gautier et al. | 92/128 |

FOREIGN PATENT DOCUMENTS

| | | |
|---|---|---|
| 0260170 | 3/1988 | European Pat. Off. . |
| 0262006 | 3/1988 | European Pat. Off. . |
| 2077376 | 12/1981 | United Kingdom ...... 92/169.2 |
| 2082275 | 3/1982 | United Kingdom ...... 91/369.2 |
| 2087016 | 5/1982 | United Kingdom . |

Primary Examiner—Edward K. Look
Assistant Examiner—F. Daniel Lopez
Attorney, Agent, or Firm—Larry J. Palguta; Ken C. Decker

[57] ABSTRACT

A pneumatic brake-booster comprises a casing on which is formed a well (12) housing operating valve mechanism, a first wall (10) having at least one opening (14) cooperating with a mechanism for fastening the casing on a fixed part of a vehicle, a second wall having at least one opening cooperating with a mechanism for fastening a master cylinder on the casing, at least one annular member (16) being disposed in the casing, against a wall. The fastening mechanism consists of at least one projecting portion (18) of the annular member (16).

3 Claims, 2 Drawing Sheets

PNEUMATIC BRAKE BOOSTER

BACKGROUND OF THE INVENTION

The present invention relates to pneumatic brake-boosters, and more particularly to their fastening on a fixed part of a vehicle or the fastening on them of a master cylinder.

Pneumatic boosters are well known in braking technique, and typically comprise a casing on which is formed a well housing an operating valve means, a first wall having at least one opening cooperating with means for fastening the casing on a fixed part of a vehicle, a second wall having at least one opening cooperating with means for fastening a master cylinder on the casing, at least one annular member being disposed in the casing, against a wall.

In conventional manner the fastening means consist of wide-headed mounting screws whose heads are disposed inside the casing, while the threaded portion of the screw extends outside the casing to receive a nut fastening the casing to a fixed wall of the vehicle or to the master cylinder.

Numerous problems arise in connection with the holding of the screwhead in the casing before its installation, and have been solved by fitting additional parts inside the casing, by crimping the screw on the casing walls, and so on.

Other problems arise in the preventing of the screw, once in place, from turning when the nut is screwed on, and have been solved by giving an antirotational shape to the screwheads as disclosed by GB-A-2 087 016.

All these solutions lead to complex, expensive constructions, which in addition entail the disadvantage of increasing the weight of the booster.

SUMMARY OF THE INVENTION

The object of the present invention is therefore a booster of the kind defined above, in which the fastening means are simple to produce, and therefore inexpensive, and contribute towards reducing the weight of the booster.

Another object of the invention is a booster having no additional fastening screw.

To this end, the present invention provides for the fastening means to consist of at least one projecting portion of the annular member.

BRIEF DESCRIPTION OF THE DRAWINGS

Other features and advantages of the present invention will emerge from the following description of two embodiments, given by way of non-limitative example and with reference to the accompanying drawings, in which.

DETAILED DESCRIPTION OF THE INVENTION

Figure 1:
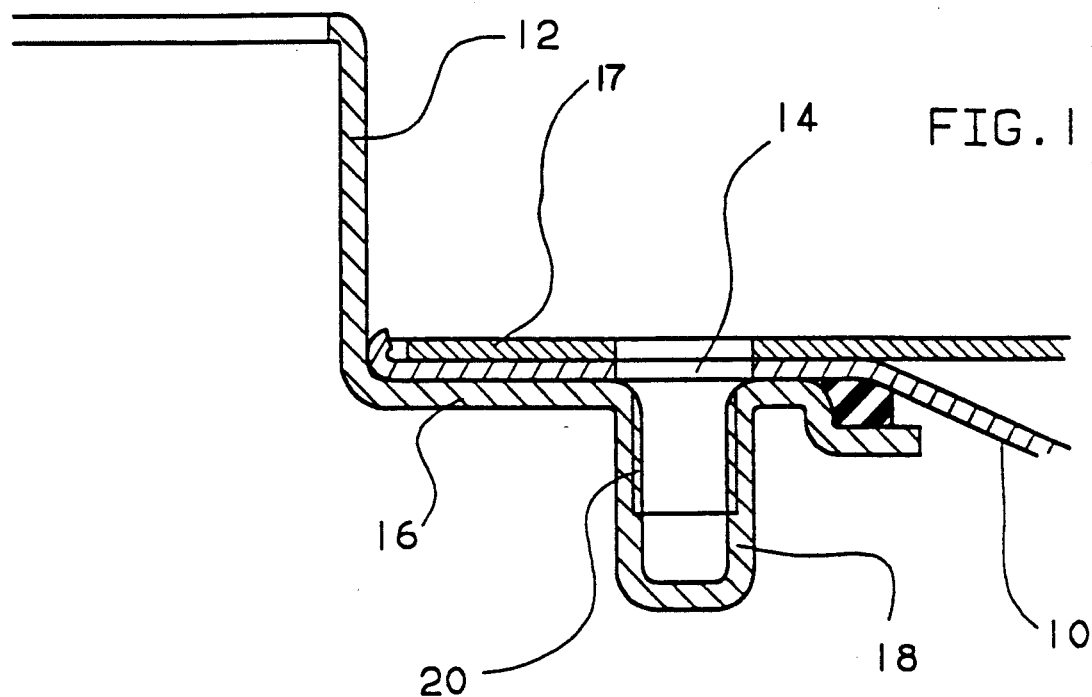
FIG. 1 is a partial sectional view of a booster mounted on a fixed wall and equipped with fastening means according to a first embodiment.

In FIG. 1 there is shown a part of the rear wall 10 of a pneumatic booster, with which is associated a well 12 intended to house valve means (not shown) controlling the operation of the booster.

In known manner the rear wall 10 has at least one opening 14 where, in techniques of the prior art, a wide-headed screw was introduced from below (referring to the figure), in such a manner that the threaded portion of the screw projected outside the booster, thus entailing the problems mentioned above in respect of holding this screw in position and against rotation.

Figure 3:
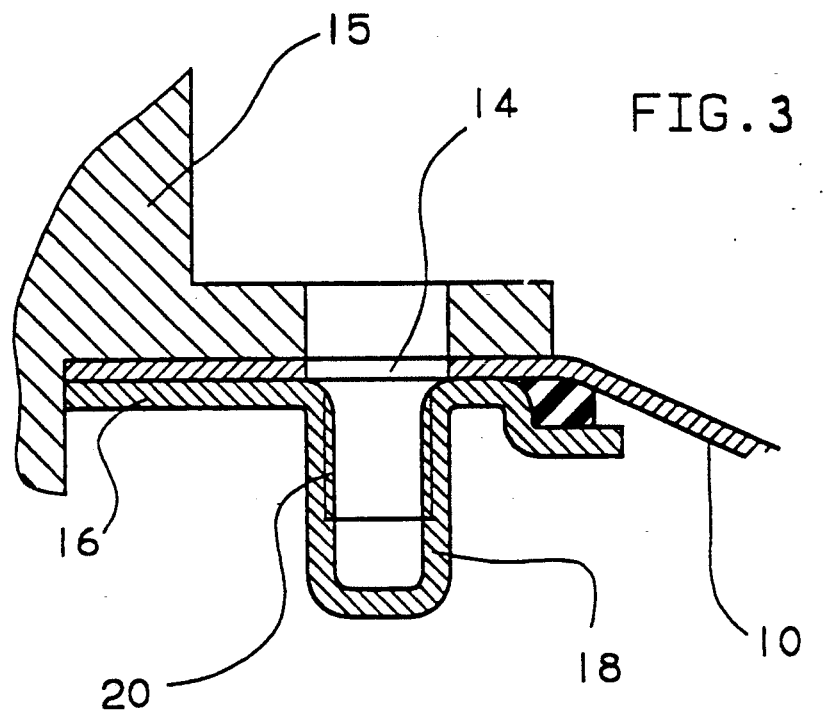
FIG. 3 is a partial sectional view of a booster mounted to a master cylinder and equipped with fastening means according to the first embodiment.

According to the invention these problems are solved by providing an annular member 16 against the wall 10. This annular member is formed with at least one projecting portion 18 directed towards the interior of the booster and situated facing the opening 14. The projecting portion 18 is preferably cylindrical and has an internal screwthread 20 enabling it to receive the threaded portion of a screw for the purpose of, fastening the booster casing on a fixed wall 17 (FIG. 1) of a vehicle or on a master cylinder 15 (FIG. 3).

Figure 2:
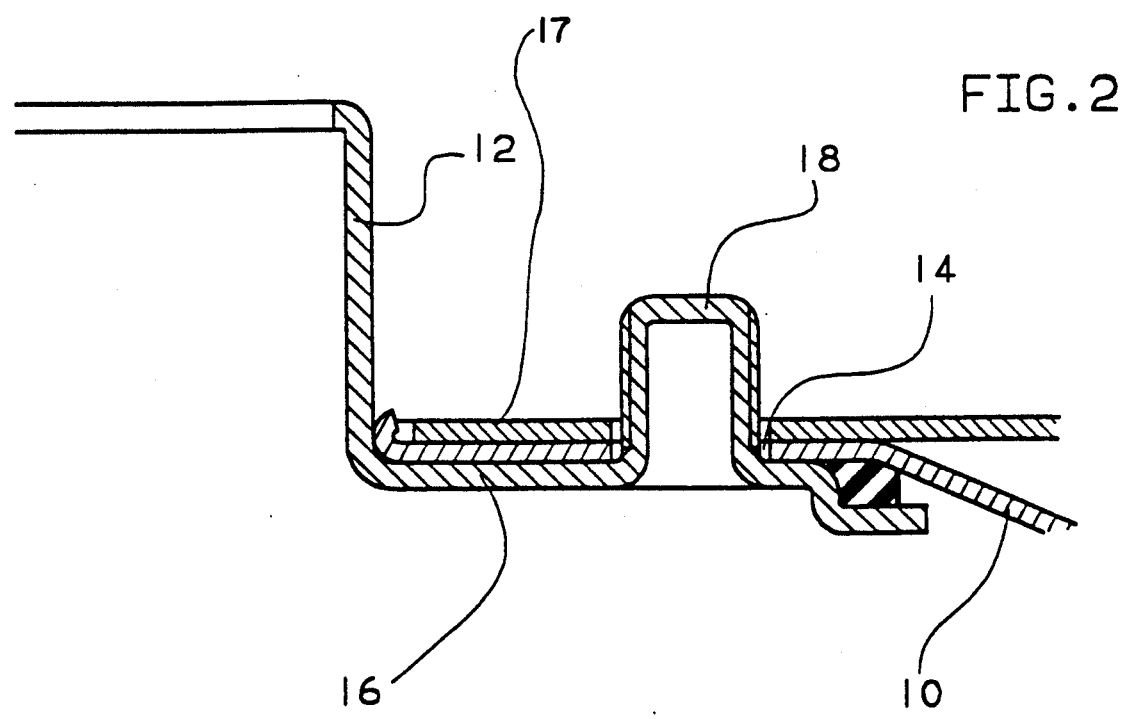
FIG. 2 is a partial sectional view of a booster mounted to a fixed wall and equipped with fastening means according to a second embodiment.
Figure 4:
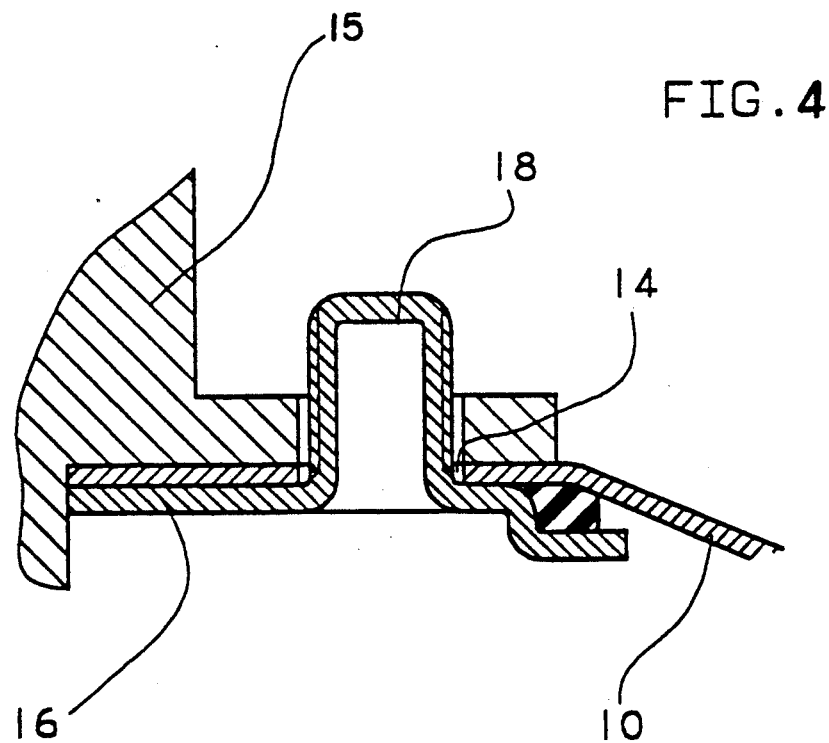
FIG. 4 is a partial sectional view of a booster mounted to a master cylinder and equipped with fastening means according to the second embodiment.

FIG. 2 shows another embodiment, in which the projecting portion 18 is directed towards the outside of the booster and passes through the opening 14. Here again the projecting portion 18 is cylindrical, but it is provided with an external screwthread 20 to receive a nut for mounting the booster on a fixed wall 17 (FIG. 2) of the vehicle, or for mounting a master cylinder 15 (FIG. 4) on the booster.

The well 12 has been shown in one piece with the annular member 16, but it is quite obvious that it may be made in one piece with the rear wall 10. In addition, the annular member 16 has been shown with a thickness substantially equal to that of the wall 10, but it is likewise obvious that it could be thicker and thus constitute a reinforcement.

What we claim is:

1. A pneumatic brake-boost located in a vehicle between a fixed part of the vehicle and a master cylinder and comprising a casing on which is formed a well which houses an operating valve means, a first wall having at least one opening cooperating with a first means for fastening the casing on the fixed part of the vehicle, a second wall having at least one opening cooperating with a second means for fastening the master cylinder on the casing, at least one annular member being disposed in the casing against the first and/or second walls, the first and/or second fastening means comprising at least one projecting portion of the annular member and the projecting portion being made of one piece with the annular member, the projecting portion of the annular member passing through the respective opening of the first and/or second walls and having an external screw thread.

2. The booster according to claim 1, wherein the annular member comprises an annular reinforcement.

3. The booster according to claim 1, wherein the annular member is made in one piece with the well which houses the operating valve means.

* * * * *